Aug. 14, 1956          D. M. BENTLEY          2,758,830
WEIGHING THE OUTPUT OF LIFTING AND LOWERING MACHINES
Filed Feb. 26, 1946                    4 Sheets-Sheet 1
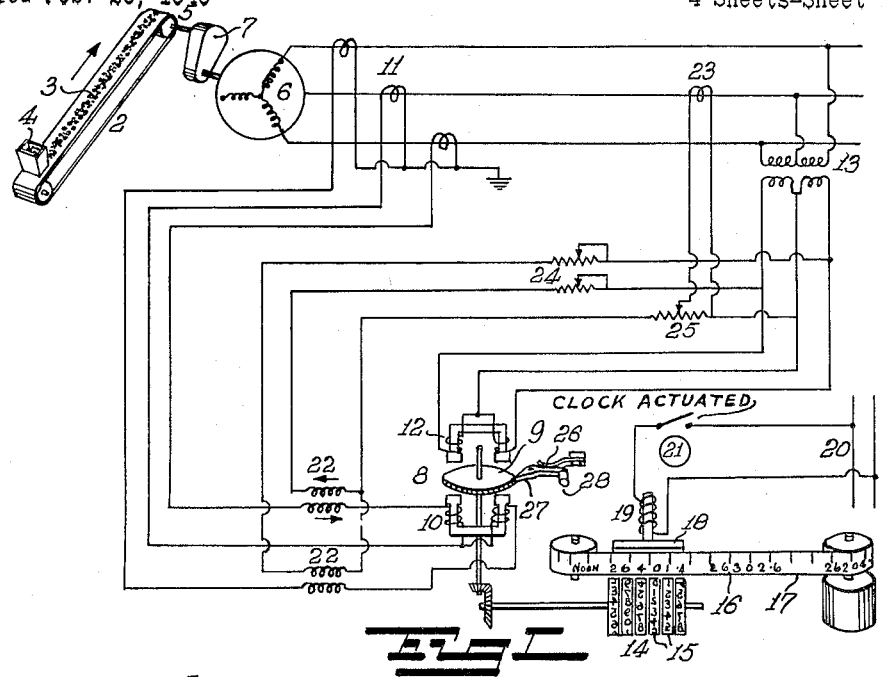
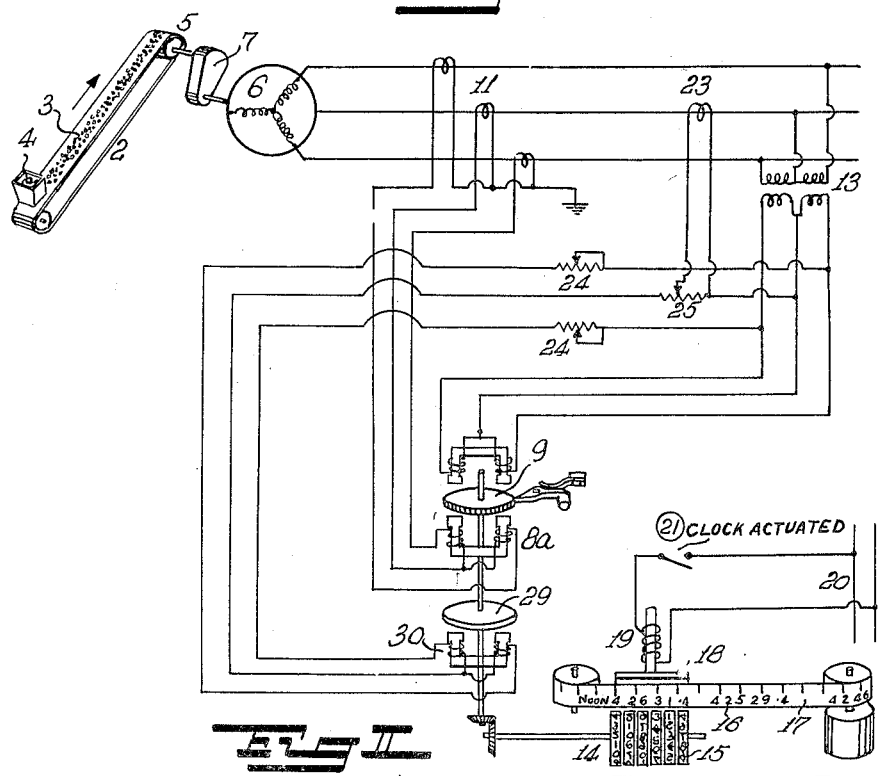
Inventor
D. M. Bentley

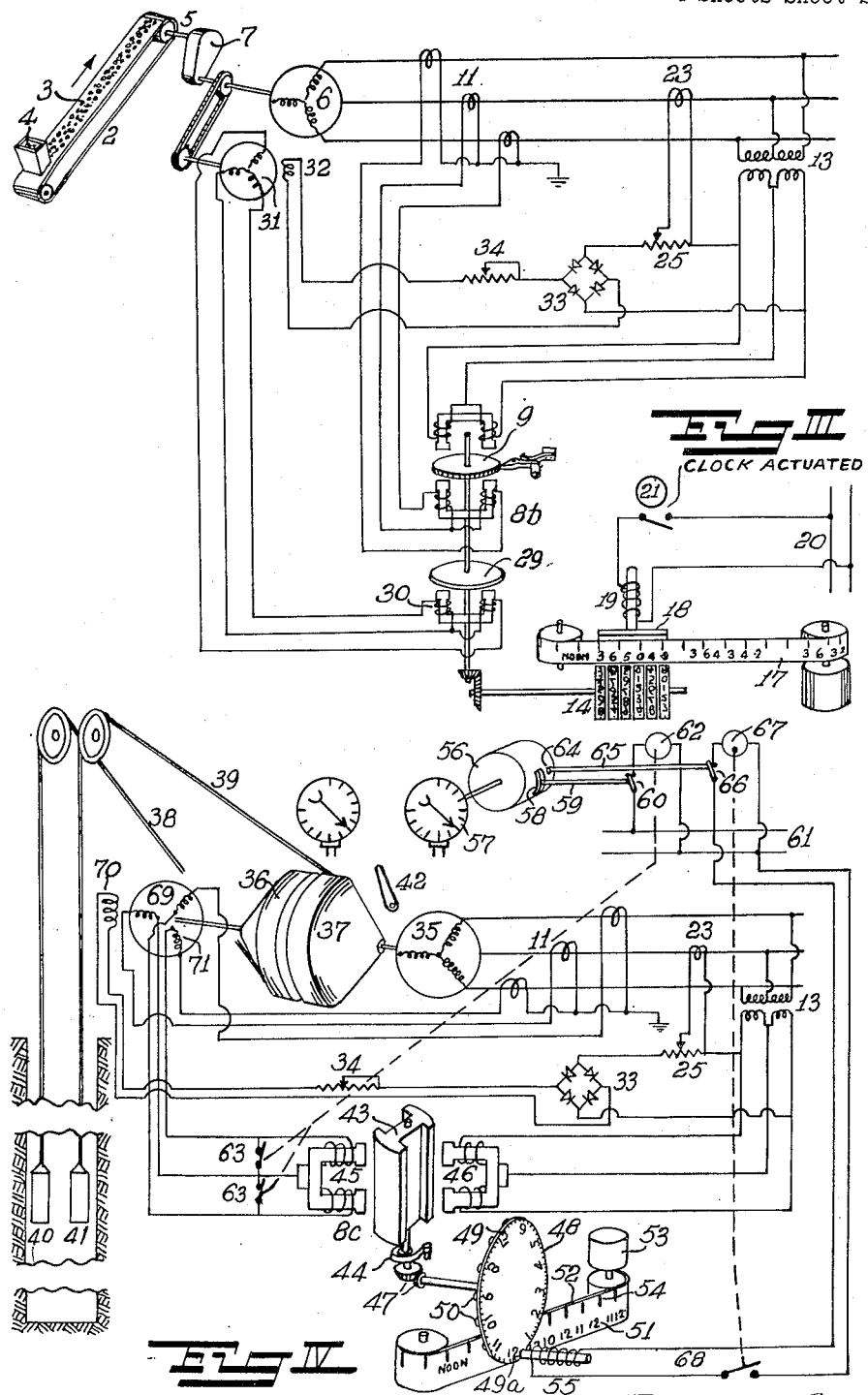

Aug. 14, 1956     D. M. BENTLEY     2,758,830
WEIGHING THE OUTPUT OF LIFTING AND LOWERING MACHINES
Filed Feb. 26, 1946     4 Sheets-Sheet 3
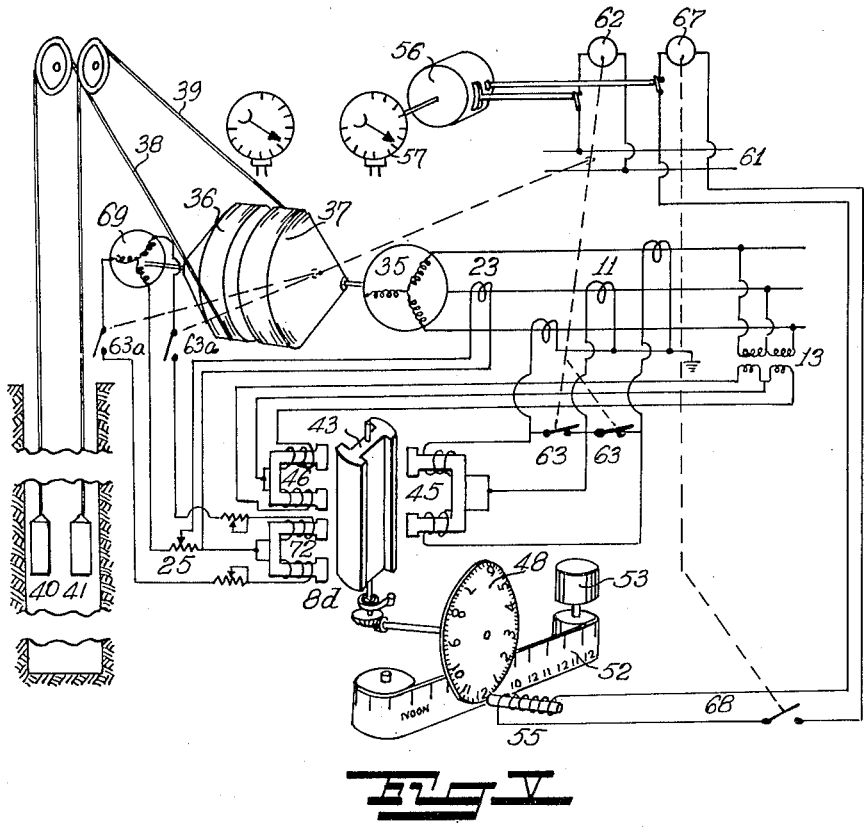
Fig. V
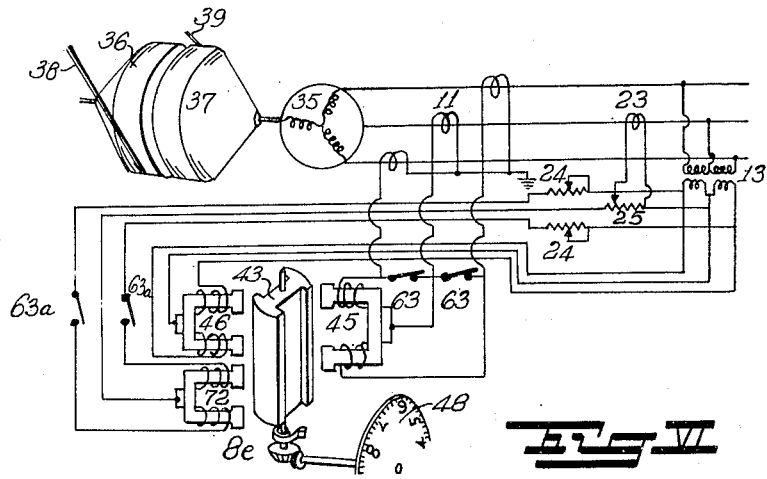
Fig. VI
Inventor
D. M. Bentley
By Haseltine Downing Pickle
Attys.

Aug. 14, 1956  D. M. BENTLEY  2,758,830
WEIGHING THE OUTPUT OF LIFTING AND LOWERING MACHINES
Filed Feb. 26, 1946  4 Sheets-Sheet 4
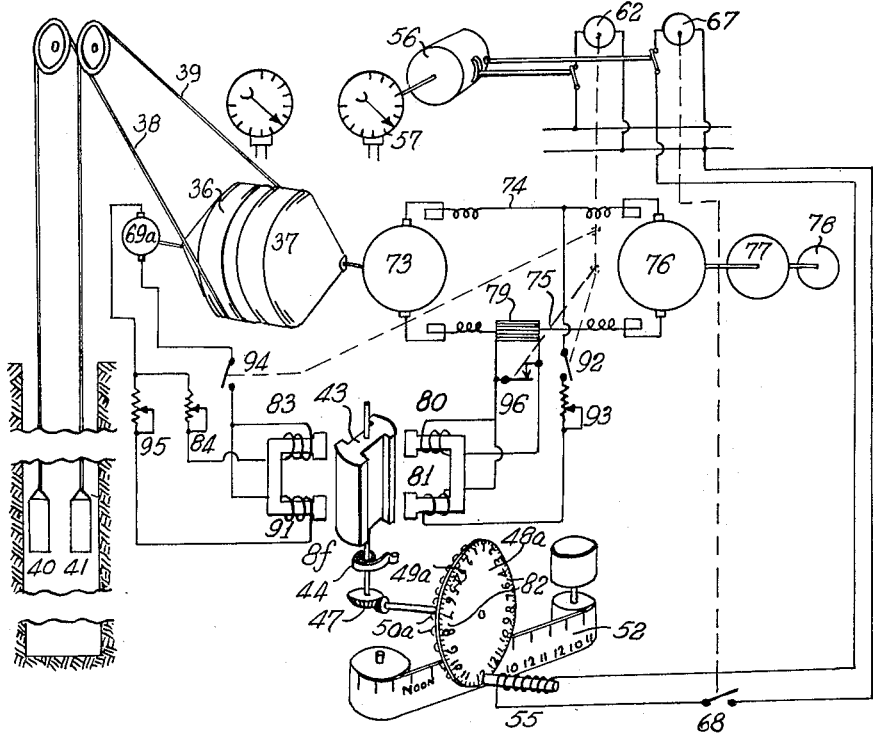

United States Patent Office 2,758,830
Patented Aug. 14, 1956

2,758,830

WEIGHING THE OUTPUT OF LIFTING AND LOWERING MACHINES

Desmond Mulock Bentley, Johannesburg, Transvaal, Union of South Africa

Application February 26, 1946, Serial No. 650,254

Claims priority, application Union of South Africa November 19, 1945

10 Claims. (Cl. 265—5)

The general object of this invention is to weigh the output, over a period of time, of a machine by which material is being raised or lowered, the weighing being accomplished while the raising or lowering operation is in progress and without interfering with said operation.

An important use of the invention is in connection with the raising or lowering of mineral matter such as ore, coal and the like by machinery usual for this purpose, such as conveyors and hoists. There is need of means that enables the weight of material produced in a mine and delivered at the surface, to be weighed without interference with the normal elevating processes, and with the degree of accuracy necessary for instance for the mine shaft output to tally properly with the surface treatment records within a small margin of error such as plus or minus one percent. It is an object of the invention to provide a process and apparatus which meets this and similar needs.

In the mineral hoists and conveyors above mentioned, the material lies substantially inert in its container or on its carrying surface while being moved, and accordingly the raising or lowering operation does not waste energy by agitating the mass of material. In general the accuracy of the results given by the invention is commensurate with the degree to which the raising or lowering process avoids internal agitation of the material.

Subject to such condition and subject to the further condition that acceleration is absent, the net force exerted by the machine on the material at any moment to maintain the material in motion in the vertical direction, is proportional to and is a true measure of the weight of the material loaded on the machine at that moment, regardless of the speed at which the material is moved and whether the movement is a lifting or a lowering movement. (The word "net" is used throughout this specification to identify weights, forces, power etc., appertaining to the material loaded on the machine, as distinct from those appertaining to the lifting or lowering machine itself.)

The weight output of the machine over a determined time period is the integral of the loaded weight, the speed and the time of the period; and since the net force is proportional to the loaded weight, the integral of the net force, the speed, and the time is also a measure of the weight output. Said last mentioned integral is moreover the measure of the net power expended in causing the loaded material to move at constant vertical speed, so that the weight output can be arrived at by measuring the value of the net power and expressing such value in terms of weight.

Two particular types of machine call for specific consideration, viz. machines constructed for continuous operation and machines such as mine hoists that transport the material in the form of batches, only one of which is moved at one time. In the case of continuous machines the speed factor is necessary to integrate the instantaneous load sustaining force, which is a variable, and consequently said speed factor has to be present as a factor in the magnitude that is measured. In the case however of the material being moved in single batches, each batch is available for a separate measurement of its sustaining force, so that speed is not necessarily present as a factor in the magnitude that is measured. Consequently in those cases where it is convenient to exclude speed as a factor in the magnitude to be measured, said magnitude need comprise only the factor of load-sustaining force, and can conveniently be arrived at by totalling the sustaining forces of all the batches moved in the time period over which the measurement is extended.

Nevertheless there are cases of batch moving, in which the magnitude that can most conveniently be measured is one in which speed is present as a factor. In those cases said factor can be prevented from influencing the measured magnitudes as between one batch and another, by arranging that all batches are moved at the same vertical speed when their measurements are taken; or by introducing a compensation that cancels out variation of speed.

If the load is accelerated while the measurement is being taken, the accelerating force appears as an addition to or substraction from the material-sustaining force, and thus tends to falsify the weight measurement. The difference between the types of machines mentioned is also of importance in regard to taking precausion against the effect of acceleration. The service required from continuous machines dictates that the average speed over equal periods long enough to be convenient as measurement periods—say an hour—shall be substantially constant, and also that there shall be no considerable or rapid variations of speed during such a period; with the result that such small plus and minus accelerations as may occur cancel one another during the period, and the necessity of taking precautions does not arise. On the other hand batch movement of the kind described necessarily involves an initial positive accelerating force being transmitted by the machine to the loaded material and usually also a final negative accelerating force. In the case of batch operated machines, therefore, the invention provides for a single measurement being made for each duty cycle, and for that measurement to be made during the unaccelerated portion of the cycle.

The process of the invention consists in moving the load by a power machine at uniform vertical speed during at least a measurement period, within that period analysing the gross power used by the machine and thereby rendering available for separate measurement a component of said power that is proportional to the weight of the load, measuring that portion by means of a measuring instrument, and physically expressing the magnitude so measured in units of measurement that indicate said weight.

Most raising and lowering machines are of rotary construction, in which case the component selected and measured is conveniently torque, but it may be net load-power or load-sustaining force. For obtaining the value of the net power or sustaining force or torque as the case may be, the invention provides a measuring instrument that is influenced by and proportionately to the gross input to the machine of such power etc., and that is calibrated to express the tare input of the same power etc., as zero. The tare input is that value required to drive the machine itself, as distinct from the loaded material, under the conditions prevailing when the measurements are made, and is basically that required to operate the machine with no material loaded on it. Said tare input is determined in any suitable way as for instance from knowledge of the characteristics of the raising and lowering machine or by test, or a combination of both. According to a feature of the invention means are provided whereby the instrument can readily be adjusted upon installation and periodically thereafter.

Conveniently the compensation for the basic tare resistance of the machine is effected by subjecting the instrument simultaneously to the influence of the gross input value and to an opposing influence commensurate with the tare input value.

According to the degree of accuracy desired, other compensations may be made, additional to that for the basic tare resistance of the machine. In particular the invention provides for the tare zeroizing adjustment compensation itself to vary to correspond to the resistance of the unloaded machine plus the additional resistance of the machine due to the presence of the loaded material. The invention further provides compensation to deal with variation of the tare resistance due to variation of speed.

The invention can be carried out in its most advantageous form when the raising or lowering machine is electrically driven and the measuring and compensating apparatus provided by the invention is itself electrical; for the reasons that the torque and power exerted by an electrical motor are quantities capable of very accurate measurement electrically and that electrical measuring and recording instruments which have already been developed to a high degree of accuracy and reliability can be used or adapted as the measuring, compensating and adjusting means of the invention.

The characterizing feature of apparatus according to the invention consists in the combination with the lifting or lowering machine of means automatically actuated by the used power for selecting a component of said power and thereby rendering said component available for separate measurement, such component being one that is proportional to the weight of the load, when the vertical speed of the load is uniform, an instrument for measuring the magnitude of said component; and means for expressing such measured magnitude in terms of weight.

Examples of the invention are shown in the accompanying drawings in which

Figure I is a diagrammatic view showing the invention applied to a continuous lifting machine.

Figures II and III are similar views showing modifications of the invention.

Figure IV is a diagrammatic view of a mine hoist driven by an A. C. motor and embodying the invention.

Figures V and VI are simliar views showing modifications of the invention.

Figure VII is a diagrammatic view of a mine hoist driven by a D. C. motor and embodying the invention.

Figure VIII shows a modification of Figure VII.

Referring to Figure I, the raising or lowering machine is of the kind adapted to operate continuously in the sense that there is or can be a continuous stream of material undergoing change of elevation. Such a machine may for instance be a bucket conveyor or a rope haulage, or as shown an elevating belt conveyor 2, receiving material 3 from a hopper 4 and discharging the raised material at 5. The machine is driven by an A. C. electric motor 6 through reduction gear 7.

The gross magnitude to be taken into account in this case is the gross power input to the motor 6 integrated with time. The measuring instrument 8 is accordingly a standard watt hour meter comprising a rotor disc 9 actuated by the current coils 10 energized from the current transformers 11, and by the potential coils 12 energized from the potential transformers 13.

The instrument 8 remains operative continuously during the lifting operation. The numerical integration is effected by a counter 14 driven positively by the rotating disc 9 and constructed with the numeral types 15 adapted to make imprints 16 on the record strip 17. Said imprints 16 are made at desired intervals of time by impact of a platen 18 actuated by the solenoid 19 energized from an auxiliary circuit 20; said circuit being closed at the desired intervals by a clock actuated switch 21. Each imprint exhibits, in terms of weight, the amount of material passed over the conveyor up to the moment when the imprint is made.

The deduction for the basic tare resistance, that is for power wasted in the operation of the conveyor 2, the reduction gear 7 and the motor 6, is effected by exerting retarding torque on the disc 9 sufficient to bring the latter to rest when the machine is operating without material loaded on it. The retarding current is impressed on the normal current coils 10 by means of current injection transformers 22. The latter are fed from a compensating network comprising the current transformer 23, the potential transformers 13, and the adjustable impedances 24 and potentiometer impedance 25.

A convenient procedure for zeroizing the measuring instrument 8 is to operate the conveyor 2 unloaded but otherwise under normal running conditions; and, during such operation so to adjust the impedances 24 and 25 that the driving and retarding torques exerted on the disc 9 are equal to one another and the disc is brought to rest. The result of such adjustment is that upon the conveyor being operated under load, the figures 16 recorded on the record strips 17 are in a high degree proportional to the weight output of the conveyor 2.

The calibrating of the measuring instrument 8 and the recording instrument 14, in order to translate the measured net power into weight units, can be effected before the instruments are installed, from a knowledge of the characteristics of the conveyor 2 and its driving motor 6.

The basic resistance of the conveyor and the motor, or in other words the mechanical and electrical loss which occurs when the conveyor is running empty, is somewhat increased by the presence of the load on the conveyor. This increase may be allowed for by over compensating during the adjusting operation just described, so that at no-load the disc 9 tends to rotate backwardly. Actual backward rotation of the disc 9 is prevented during the use of the machine by the provision of a pawl and ratchet wheel device 26 which is often fitted to the discs of watt hour meters; so that the prolonged operation of the machine in its unloaded condition is prevented from falsifying the record of weight delivered. It is however convenient to retract the pawl 27 by pressing the press button 28 and allow the disc 9 to rotate backward during the zeroizing adjustment procedure, in order to estimate the amount of overcompensation to be allowed for. The required amount of over compensation may be found by trial or estimated from a knowledge of the characteristics of the conveyor.

Figure II shows a modification of the last described arrangement in which the current injection transformers 22 are omitted and in which the measuring instrument 8a itself is modified to apply the compensating currents to the rotor. The instrument is of the watt hour meter type but its rotor is fitted with a second disk 29 having its own set of current coils 30 and potential coils, which for clarity of the diagram are omitted. The compensating current is derived from the aforedescribed compensating network comprising the additional current transformer 23, the potential transformers 13 and the adjustable impedances 24 and 25.

A special feature of the example shown in Figure III is that the machine is intended to operate at several different constant speeds; the compensation for the additional tare resistance of the machine over the basic tare resistance, being extended to compensate for change of tare resistance due to the change of speed; and that the compensation is automatically varied to correct for wide variations of both loading and speed. With this object the apparatus includes the auxiliary generator 31. Said generator 31 is driven positively with motor 6 and is in proper phase relationship therewith. The generator output is applied to the auxiliary current coils 30 which exert counter-torque on the auxiliary rotor disc 29.

The field coil winding 32 of the auxiliary generator 31 is separately excited from the power supply through potential transformers 13, a rectifier 33, and a variable potentiometer impedance 34. This rectified supply to the field of the auxiliary generator is compounded from the actual load current taken by the driving motor 6, by means of the current transformer 23 and potentiometer 25. The compounding is designed to modify the output from the auxiliary generator 31 in such a manner that it compensates the instrument 8b, for the varying tare electrical and mechanical losses associated with operation of the conveyor at varying loading.

In making the adjustment to zeroize said measuring instrument the conveyor is operated unloaded at some predetermined normal speed. The load compounding network described is adjusted by means of the potentiometer 25, and the total output from the auxiliary generator 31 is adjusted by means of the field control rheostat 34, to bring the rotating movement of the instrument discs 9 and 29 to rest.

Once these initial adjustments have been accurately made in this manner and checked at the several speeds at which the machine is intended to operate, automatic adjustment is provided from auxiliary generator 31 for both changes in speed and in loading of the conveyor 2, to compensate for the corresponding variations of the electrical and mechanical losses, and the output recorded will continue to register accurately the net output of the material delivered in tons per hour, or other convenient measure.

Figure IV shows the invention applied to a double drum mine hoist driven by an A. C. motor 35. In this figure 36, 37 indicate the two drums on which the two winding ropes 38, 39 are wound in opposite directions so that one winds on to its drum while the other winds off its drum. The ropse 38, 39 carry the respective conveyances 40, 41 which are similar and which are accordingly in static balance when they are unloaded and both positioned in mid shaft. Control gear indicated by 42 is provided for reversing the motor after each duty cycle of the hoist. It is a characteristic of this kind of machine that in each trip a conveyance passes through a lifting cycle consisting of a period of positive acceleration, a period of constant speed and a further period of negative acceleration; and further that the load remains constant throughout the cycle. The form of the invention provided for this class of machine is equivalently characterized by taking a single measurement for each trip and by that measurement being taken during the period of the trip in which the speed is uniform. The entity measured in this case is power; but owing to the single measurement being taken during each trip, the speed factor of the power is of no significance and is not effectively measured. The measuring instrument 8c is accordingly a normal indicating and recording wattmeter; the wattmeter proper comprising the rotatable armature 43 restrained by the spring 44, and influenced jointly by the current coils 45 and the potential coils 46. The torque exerted by the motor 35, is reflected by the angular displacement of said armature 43. Said displacement is transmitted by bevel gears 47 to the indicating and printing disc 48. On the one side of the disc there may be provided the indicating scale comprising the set of numerals 49; the scale being so positioned on the disc 48 that the numeral which is in the lowest positions indicates the measured magnitude. On the reverse side of the disc 48 are similar and similarly positioned type numerals 50 for making the weight records 51 on the record strip 52. Said strip 52 is moved continuously by a clock device 53; and a corresponding scale of time 54 is printed on its face to co-ordinate the record figures 51 with time. The printing is effected by the impact of the solenoid 55.

The instrument 8c remains unenergized throughout the greater part of the hoisting cycle; but the apparatus includes means whereby said instrument is rendered active during a short period before and after the moment at which the conveyances pass one another during the constant speed portion of the duty cycle. For this purpose the rotary cam drum 56 is rotated in synchronism with the hoist movements, for example through the medium of one of the depth indicators 57. Said cam drum 56 carries the adjustable cam 58 which actuates a push rod 59 to close the auxiliary switch 60 for a short period commencing before and ending after the moment of mid wind. Said switch 60 completes a circuit from an auxiliary current source 61, to timing contactor 62. By opening its normally closed contacts 63, contactor 62 permits the instrument to be energized. The cam drum 56 carries a second adjustable cam 64 which is positioned to operate at the moment when the conveyors 40 and 41 pass one another. It operates through a second push rod 65 to close a switch 66 and thereby energize contactor 67, which, by closing its normally open contacts 68 causes the solenoid 55 of the printometer mechanism 48, 52, 53 to be actuated to print on the strip 52, the numeral 59a, which is at the moment at the bottom of the disc 48 and which indicates the weight of the load.

The means shown in this example for compensating for the tare loading of the motor 35 comprises an electrical network that produces a compensating current that is impressed on the wattmeter 8c. Said network includes an auxiliary A. C. generator 69 driven synchronously with the hoist and arranged in proper phase relationship with the hoist motor 35. The field winding 70 of said generator 69 is energized from the potential transformers 13, through the rectifier 33.

Current from the current transformers 11 is passed through the armature winding 71 of said auxiliary generator 69 and is thereby diminished in amount according to the hoist speed and to the strength of the field applied to the auxiliary generator 69, which latter is controlled by the rheostat 34. The diminished current is impressed on the instrument current coils 45, the output from the auxiliary generator 69 being in opposition to the regular actuating current derived directly from the current transformers 11.

The procedure in making the adjustment of the compensation for tare resistance is in general similar to that described above. That is to say the hoist is run without load at normal hoisting speed, and rheostat 34 is adjusted until the opposing current supplied by the auxiliary generator 69 equals the primary current taken by the motor 35. Under those conditions no current passes through the coils 45 and the instrument 8c indicates zero.

Since the motor 35 and the generator 69 operate in synchronism, the compensation thus made for the normal full speed hoisting is maintained with only small loss of precision under reasonable changes of the hoist speed; thus helping to avoid falsification of the weight measurement due to the inclusion of hoist speed in the magnitude that is measured by the instrument 8c and recorded by the disc 48, in terms of weight.

Compensation for increase of the no-load power waste of the hoist due to the addition of the useful load, or in other words, compensation for resistance of the machine additional to the basic tare resistance, may be effected either by over adjusting the rheostat 34 in the first instance; or by compounding the field of the generator 69. Means suitable for the latter purpose may comprise a current transformer 23 supplying compounding current to the rectifier 33 by means of potentiometer impedance 25 so that the excitation of the field of said auxiliary generator 69 is modified in proportion to the current taken by the hoist motor 35. The compounding current thus supplied is adjusted by means of the potentiometer 25.

When the conveyances 40, 41 are ore skips, the overall accuracy of the weighing apparatus is not impaired by incomplete or inconsistent emptying of such conveyances, since any material weighed during an upward movement say of the first skip 40 but not emptied at the termination of that movement gravitationally counterbalances an equal weight of material in the second skip 41 during the next upward movement of said second skip and correspondingly reduces the weight recorded during such and subsequent movements of said second skip until the material in question is discharged from the first skip 40. Similarly in the case of the endless conveyor of the first two examples material that is weighed while on the ascending side of the belt causes a reduction in the output total in case it should stick to the belt and be carried back on the return side of the latter.

The apparatus and the methods of adjustment described in connection with Figure IV are equally applicable to a single drum hoist or to a double drum hoist operating out of balance, provided the record is always made at the same point of the trip so that the amount of unbalance, which is not caused by the load of material, remains constant throughout the series of records.

Figure V shows a further example, the principal distinction of which from the Figure IV example is that the instrument main current coils 45 are directly energized from the current transformers 11 in the manner usual in wattmeters and the no-load and speed compensating current supplied by the auxiliary generator 69 is impressed on separate instrument coils 72 which are not present in a normal wattmeter and which act in opposition to the instrument main current coils 45. Furthermore, the current that compensates for the extra tare losses due to the presence of the load, and that is derived from transformer 23 is applied directly to the compensating current coils 72 by means of potentiometer impedance 25 instead of its being used to modify the field applied to the auxiliary generator 69; which latter accordingly is of the permanent magnet or fixed field type. This additional load loss compensation effect is adjusted by the variable potentiometer 25. Timing contactors open contacts 63 and close contacts 63a to energize the measuring instrument as previously described.

Figure VI shows a modification and simplification of the apparatus of Figures IV and V that can be used when the frequency of the power supply is so closely constant as to render speed variation of the hoist of negligible value relatively to the degree of accuracy desired in the weight record. The auxiliary generator 69 is omitted. The no-load compensating current is derived from the network comprising 13, 23, 24 and 25 and is supplied directly to the instrument 8c; and it is convenient thus to apply it by means of the separate coils 72, described in connection with Figure V.

In the next example illustrated in Figure VII the motor 73 driving the hoist is a D. C. motor controlled on the Ward-Leonard system. That is to say said motor 73 is energized through the leads 74, 75 from a generator 76 of the Ward-Leonard converter set which also includes the A. C. driving motor 77 and the motor and generator field exciter 78.

The magnitude measured in this case may be the net power input of the motor 73 or generator 76, but the simple torque equation of the D. C. motor 73 renders it a simple and convenient matter to measure torque directly; and, as pointed out above, the factor of net load sustaining force (or net torque), are sufficient to enable the weight output of batch hoisting to be measured.

Neglecting losses and providing the motor excitation or field flux remains constant, the output torque exerted by the motor 73 is directly proportional to the armature current flowing through said leads 74, 75; so that an ammeter type of measuring instrument 8f energized from a shunt 79 in one of the leads 75 is adapted to measure a magnitude that is directly and arithmetically proportional to such torque.

The main operating coil of the instrument 8f is indicated by 80 and 43 represents the armature portion of the instrument 8f, controlled by the spring 44.

The armature 43 is connected by the gearing 47 to the disc 48a which is similar to the disc 48 of Figure IV in having the type numerals 50a on its back face, with or without the indicator 49a on its front face. However, since the armature 43 reverses with the reversal of the motor 73, these graduations 82 are duplicated at each side of the centre zero o.

The auxiliary generator 69a in this case generates direct current directly proportional in amount to the speed of the motor 73. Said generator 69a energizes a compensating coil 83 included in the instrument 8f so as to oppose coil 80. In the circuit of coil 83 is the adjustable rheostat 84.

In adjusting the instrument 8f to compensate for tare loading of the motor 73 by the procedure described in connection with Figure IV, the rheostat 84 is so adjusted that when the conveyances are passing one another at constant speed and consequently the system is in balance both dynamically and statically, the torques exerted by the coils 80 and 83 are equal and opposite and disc 48a indicates zero; or less than zero in order to compensate for the increase of the tare resistance due to the presence of the net material load. Alternatively the over-compensation in question may be attained automatically by slightly compounding the auxiliary generator 69a from the main armature current taken by the hoist motor 73. Such modified arrangement is shown in Figure VIII, where the corresponding auxiliary field winding 85 is fed by leads 86, 87 taken off from opposite sides of the compensating field and interpole coils 88 of the D. C. hoist motor 73. The magnitude of the compounding current is adjusted by a rheostat 89. In the compounding circuit is a reversing contactor 90, linked to the motor reversing and speed control mechanism 42, for maintaining constant the polarity of the current in the auxiliary field winding 85. The effect of the adjustment of resistance 89 or of the compounding winding 85 is that additional armature current consumed in overcoming the additional loss in the apparatus itself, due to the presence of the load, is reflected as an addition to the current that energizes the no-load compensating coil 83.

Since the auxiliary generator 69b rotates at a speed at all times either equal to or proportional to that of the motor 73, whilst the output of the former and for all practical purposes the current intake of the latter when operating the hoist without load, are—other factors being unchanged—proportional to their speeds, the tare compensating effects described hold good notwithstanding changes in the normal full speed of the hoist.

The apparatus shown in Figure VII also includes compensating means to provide for the eventuality of change of the field flux strength of the hoist motor 73 and of the generator 76, causing a change in the pre-determined relationship between the torque exerted by said motor 73 and the armature current of the said motor 73 measured by the instrument 8f, and a corresponding change in armature voltage which is not accompanied by change in the hoisting speed (during the constant speed portion of the hoisting cycle), and which would not therefore be compensated for by the generator 69a, operating through compensating coil 83.

To deal with these conditions there are provided compensating coils 81 and 91. The coil 81 is excited from the motor armature leads 74, 75 through a circuit including the normally open contact 92 of timing contactor 62 and an adjustable rheostat 93; and therefore the torque exerted by coil 81 when energized is at all times proportional to the voltage applied to the hoist motor 73.

The coil 91 is excited from the auxiliary generator 69a through the normally open contact 94 and adjustable rheostat 95 and the torque exerted is therefore proportional to the hoisting speed. Said coils 81 and 91 are arranged to apply opposite torque to the ammeter armature 43. Moreover these torques are so adjusted by means of rheostats 93 and 95 (during the adjustment of the measuring instrument 8f described above) that, under normal full speed and full load hoisting conditions, their torques are equal and consequently have no effect on the measuring instrument 8f.

If, for example, after the measuring instrument compensating means have been adjusted, as previously described, to suit the requirements of the predetermined normal hoisting conditions, the setting of the exciter 78 were to be altered, inadvertently or otherwise, to increase the output voltage of 78 the voltage generated by generator 76 and applied to hoist motor 73 would be increased but the hoist speed would remain substantially unchanged, since motor 73 also derives its field current from the common exciter 78. Accordingly the predetermined relationship between hoist motor 73 armature current and torque would be upset, the measuring instrument 8f giving a reduced and erroneous representation of the latter.

Compensating coils 81 and 91 are provided to correct errors arising from this cause. The torque produced by coil 81, operating on the moving armature 43 of the measuring instrument 8f, being proportional to the voltage applied to the hoist motor 73, will be increased to overcome the previously equal and opposite torque produced by coil 91. In this manner the reading recorded by the measuring instrument 8f will be increased; thereby correcting for the new armature current torque relationship of the hoist motor 73.

Conversely, if the setting of the exciter 78 should be altered to lower the output voltage of the exciter 78, thereby reducing the field flux strength on both the hoist motor 73 and the generator 76, the torque produced by coil 91 will overcome that produced by coil 81 in the measuring instrument 8f, to correct again for the altered armature current/torque relationship of the hoist motor 73.

A condition, such as that described in the sixth preceding paragraph, could arise if the voltage of the exciter 78 supplying the fields of both the Ward-Leonard generator 76 and the winder motor 73 were altered from the value at which the indicating instrument 8f was originally calibrated and adjusted on site. The coils 81 and 91 are energized at the same time as coils 80 and 83 by the closing of contacts 94 and 92 and the opening of contact 96 of the timing contactor 62.

I claim:

1. Apparatus for elevating a load and for registering the net weight of said load comprising, in combination, a mechanism including an electric motor for elevating the load, an electrical instrument connected to the circuit of said motor so as to be influenced in accordance with the magnitude of an electrical quantity in said circuit which varies in accordance with the sum of the weight of the load and the tare load of said mechanism, and a compensating electrical network connected with said instrument and the motor circuit for compensating the instrument registration in an amount substantially proportional to the magnitude of an electrical quantity in said circuit which varies in accordance with the tare load of the mechanism, whereby the instrument registration is substantially proportional to the weight of the load being elevated.

2. The apparatus in accordance with claim 1 in which said instrument is of the wattmeter type.

3. The apparatus in accordance with claim 1 in which the instrument is of the ammeter type.

4. The apparatus in accordance with claim 1 in which said instrument is an electromagnetic instrument comprising a movable member and main and compensating windings, said windings being energized respectively by currents which are to a material extent proportionate to the current input to the motor and to the tare current.

5. The apparatus in accordance with claim 1 in which said instrument is an electromagnetic instrument having a movable member influenced to move in one direction by a force proportionate to the gross power input to said motor, and in the other direction by the compensating influence of a force proportionate to the tare power input to the motor.

6. The apparatus in accordance with claim 5, and means for preventing movement of said member in said other direction.

7. Apparatus in accordance with claim 1 in which said compensating network includes an auxiliary electrical generator driven synchronously with said motor, the output of said generator constituting the component fed to the instrument to compensate it.

8. The apparatus in accordance with claim 1, and means for providing a printed indication of the registration of said instrument.

9. The combination claimed in claim 1 in which the mechanism is constructed for moving batches of material one at a time and the measuring instrument is arranged to make intermittent measurements one for each batch.

10. The combination claimed in claim 1 in which the mechanism is constructed for moving batches of material one at a time and the measuring instrument is arranged to make intermittent measurements one for each batch and in which the first-mentioned electrical quantity selected and measured is net load-sustaining force or torque.

References Cited in the file of this patent

UNITED STATES PATENTS

| | | |
|---|---|---|
| 1,011,273 | Thomas | Dec. 12, 1911 |
| 1,163,678 | Messiter | Dec. 14, 1915 |
| 1,175,508 | Burke | Mar. 14, 1916 |
| 1,186,218 | Merrick | June 6, 1916 |
| 1,206,284 | Allen | Nov. 28, 1916 |
| 1,308,656 | Burke | July 1, 1919 |
| 1,449,458 | Sutermeister | Mar. 27, 1923 |
| 1,777,670 | Hausman | Oct. 7, 1930 |
| 1,902,307 | Larkin | Mar. 21, 1933 |
| 1,942,920 | Fawkes | Jan. 9, 1934 |
| 1,979,340 | Norman | Nov. 6, 1934 |
| 2,132,237 | Haegele | Oct. 4, 1938 |
| 2,172,618 | Kuppenbender | Sept. 12, 1939 |
| 2,218,668 | Wagner | Oct. 22, 1940 |
| 2,342,567 | Xenis et al. | Feb. 22, 1944 |
| 2,600,966 | Carrier | June 17, 1952 |